US007774413B2

(12) United States Patent
Costea et al.

(10) Patent No.: US 7,774,413 B2
(45) Date of Patent: Aug. 10, 2010

(54) EMAIL MESSAGE HYGIENE STAMP

(75) Inventors: Mihai Costea, Redmond, WA (US); Daniel D. Longley, Bellevue, WA (US); Malcolm E. Pearson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1358 days.

(21) Appl. No.: 11/215,823

(22) Filed: Aug. 30, 2005

(65) Prior Publication Data
US 2007/0050444 A1 Mar. 1, 2007

(51) Int. Cl.
G06F 15/16 (2006.01)
(52) U.S. Cl. .................. 709/206; 709/204; 709/205; 709/202; 726/22; 726/23; 726/24
(58) Field of Classification Search ......... 709/204–206; 726/22–24
See application file for complete search history.

(56) References Cited

U.S. PATENT DOCUMENTS 6,986,051 B2 * 1/2006 Le Pennec et al. .......... 713/188

2002/0147780 A1* 10/2002 Liu et al. .................... 709/206
2005/0097174 A1* 5/2005 Daniell ....................... 709/206

OTHER PUBLICATIONS

SpamAssassin, The Powerful #1 Open-Source Spam Filter (4 pages) http://spamassassin.apache.org/.
PostinoDotCom, Copyright Postino Dotcom (4 pages) http://www.postino.com/.
Resnick, P., "Internet Message Format," Network Working Group, Apr. 2001 (48 pages) http://www.ietf.org/rfc/rfc2822.
Crocker, David H., "Standard for the Format of ARPA Internet Text Messages," RFC #822, Aug. 13, 1982 (49 pages) http://www.iet.org/rfc/rfc822.

* cited by examiner

Primary Examiner—Duyen M Doan
(74) Attorney, Agent, or Firm—Perkins Coie LLP

(57) ABSTRACT

Techniques for eliminating duplicate/redundant scanning of email messages while the email message traverses the various servers within an email infrastructure are provided. Some techniques utilize a message hygiene stamp that is transported with the email message as the email message enters an enterprise and is routed within the enterprise until the email message reaches the end user inbox. The filters comprise logic that enables the filters to annotate the result of their filtering or other processing in corresponding message hygiene stamps. The message hygiene stamps allow the filters to determine whether the email message has already been processed by the filter within the email infrastructure.

16 Claims, 7 Drawing Sheets

EMAIL MESSAGE HYGIENE STAMP

BACKGROUND

The proliferation of computers and the advent of the Internet and the maturing of the World Wide Web ("web") have significantly increased the use and dependence of email communication. However, the increased reliance on email has exposed the individuals and corporations that use email to threats from, for example, email viruses, spam, phishing attacks, and the like. Commercially available anti-virus software packages are typically employed to combat such attacks.

Email is a highly distributed server application, where an email message typically travels through a set of servers after entering an enterprise, until the message reaches the addressed end user's inbox. With the huge amount of spam and phishing emails that are reaching enterprise gateways, filtering technologies have become important in ensuring the email flow is preserved clean while the filtering is happening as soon as the emails enter the enterprise perimeter. However, some of the filtering techniques require access to resources that are not widely available (e.g. Active Directory information that stores admin policies, end user preferences, etc.). Therefore, even though filtering is a very expensive operation in terms of computing resources, the filtering is going to be deployed at different places (i.e., email servers and clients) in the overall email infrastructure.

The distributed nature of the email "application," which includes the email servers and clients, coupled with the rather unpredictable nature of the email infrastructure (e.g., some routing servers might be down making the email traffic take different routes) make it difficult to guarantee that an email reaching the client has actually been filtered by the full set of filters as dictated by, for example, the enterprise's security policy. Another difficulty is ensuring that the email, while being routed towards the email client, is not unnecessarily filtered multiple times by the same filter version, thus adding no value or benefit to performance. These difficulties are further compounded when filters from different vendors are deployed within in the email infrastructure, for example, in cases where different email clients connect with different filter versions (e.g., smart phone vs. MICROSOFT OUTLOOK).

SUMMARY

Techniques for eliminating duplicate/redundant scanning of email messages while the email message traverses the various servers within an email infrastructure are provided. The techniques utilize a message hygiene stamp that is transported with the email message as the email message enters an enterprise and is routed within the enterprise until the email message reaches the end user inbox. The filters comprise logic that enables the filters to annotate the result of their filtering or other processing in corresponding message hygiene stamps. The message hygiene stamps allow the filters to determine whether the email message has already been processed by the same filter or a later version of the filter within the email infrastructure.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
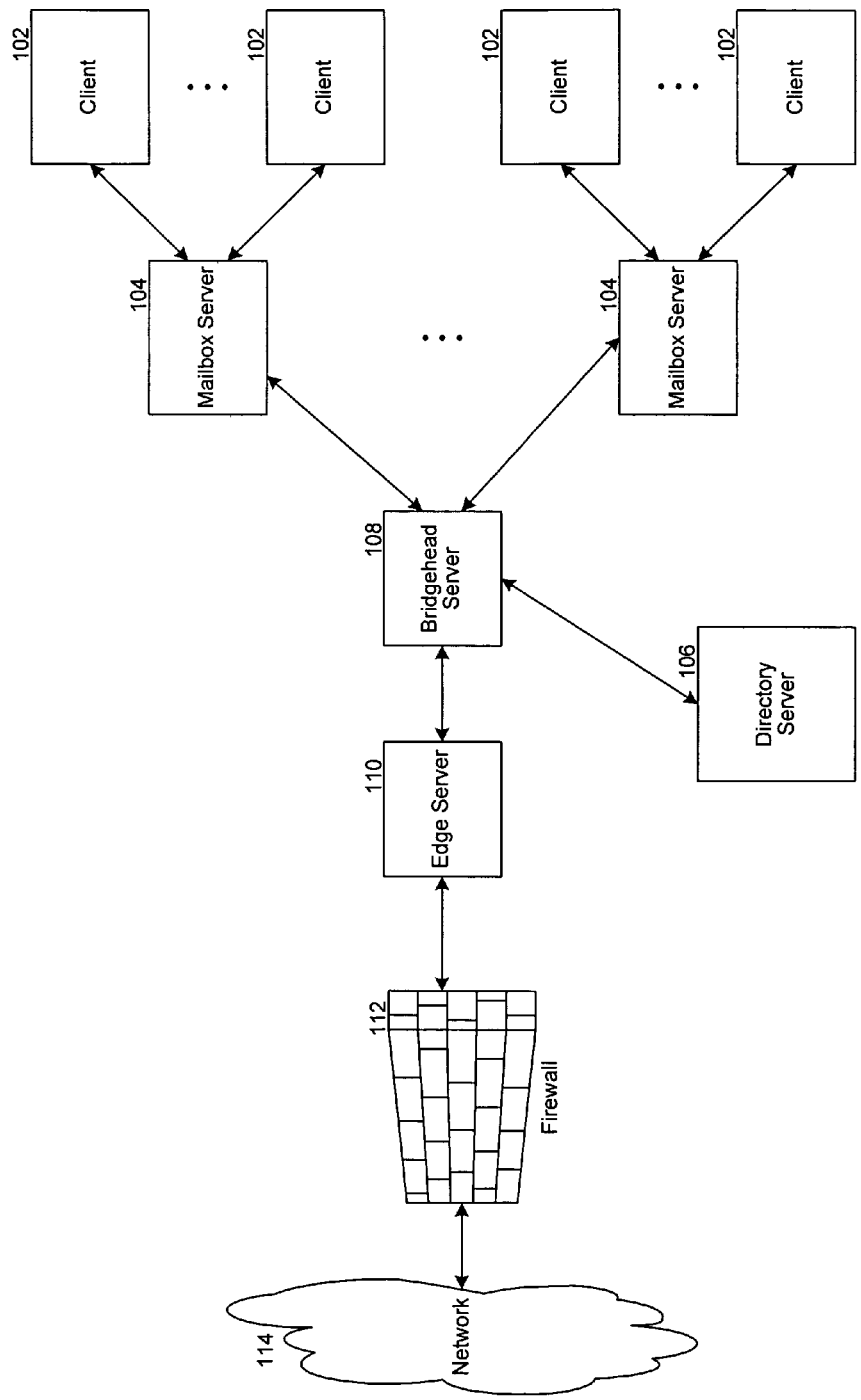
FIG. 1 is a high-level block diagram showing an environment in which the message hygiene stamp may operate.

Various techniques for eliminating duplicate/redundant scanning of email messages while the email message traverses the various servers within an email infrastructure are provided. For example the set of filters may be deployed within the email infrastructure as dictated by a security policy, such as, by way of example, an enterprise security policy. The described techniques generate and utilize a message hygiene stamp that is transported with the email message as the email message enters an enterprise and is routed within the enterprise until the email message reaches the end user inbox.

In some embodiments, filtering agents, security agents, and other agents (e.g., compliance agents, journaling/archiving agents, etc.), which are deployed at various places within the overall email infrastructure of an enterprise comprise logic that enables the agents to annotate the result of their filtering or other operations in a message hygiene stamp. In the following, the various techniques for determining that an email message reaching a client has not been redundantly processed by the agents as dictated by a security policy are described in the context of filtering agents. One skilled in the art will appreciate that the similar functionality can be provided for other types of agents, including the aforementioned security agents, compliance agents, journaling/archiving agents, the like. For example, a filtering agent may determine whether an email message has associated with it a message hygiene stamp that identifies or corresponds to the same or later version of the filtering agent. If the email message does have a message hygiene stamp that corresponds to the same or later version of the filtering agent, the filtering agent does not process (i.e., filter) the email message. Conversely, if the email message does not have a message hygiene stamp that corresponds to the same or later version of the filtering agent, the filtering agent processes (i.e., filters) the email message and places a message hygiene stamp that corresponds to the filtering agent on the email message. The filtering agent may include an indication of its identity in the message hygiene stamp as well as the result of the processing the filtering agent performed on the email message. The message hygiene stamp is then transported with the email message as the email message is routed within the email infrastructure to its destination. Use of message hygiene stamps provides a performance benefit in that the same email message is not processed multiple times by the same agent, for example, deployed at various different places in the email infrastructure, as the email message is being routed towards the email client (i.e., end user).

In some embodiments, an email client may determine from the message hygiene stamps that are received with an email message whether the email message adheres to the security policies that are deployed within an email infrastructure. The security policies may be stored on a data store that is accessible by the email client. When an email client receives an email message, the email client can identify from the security policies a message hygiene stamp that should be present with the received email message. The email client can then check the email message to determine whether the email message has the necessary message hygiene stamp. If the email message does not have the necessary message hygiene stamp, the email client can indicate that the email message may not be secure. Conversely, if the email message has the necessary message hygiene stamp, the email client checks the message hygiene stamp to determine whether the message hygiene stamp indicates that its corresponding filtering agent successfully processed the email message. If the message hygiene stamp indicates that the corresponding filtering agent unsuccessfully processed the email message, the email client can indicate that the email message may not be secure. The email client can then identify from the security polices other message hygiene stamps that should be present and processes the email message in a similar manner to ensure that the email message adheres to the deployed security policies. For example, if the email client determines that the email message does not adhere to the deployed security policies, the email client may send an alert to an administrator indicating that there is a route in the email infrastructure that might be insecure. As another example, if the email client determines that the email message was not processed by one or more of the deployed security policies, the email client may send the email message to a location, such as, by way of example, a server within the email infrastructure where the missing security polices can be applied to the email message.

In some embodiments, when an email message first enters the email infrastructure, a software facility may remove the message hygiene stamps that are received with the email message. For example, the software facility may check to determine whether the email message is received from an untrusted source, and if the email message was received from an untrusted source, the software facility cleans or removes the message hygiene stamps that may have been received with the email message.

In some embodiments, the software facility may remove the message hygiene stamps from an email message prior to the email message leaving the email infrastructure. For example, the software facility may check to determine whether the email message is to be sent to an untrusted destination, and if the email message is to be sent to an untrusted destination, the software facility cleans or removes the message hygiene stamps prior to the email message leaving the email infrastructure on its route to the untrusted destination.

In some embodiments, the software facility may be implemented as a software program process that executes on a server that receives and processes email messages as the email messages enter/leave the email infrastructure, such as, by way of example, an edge server within the email infrastructure. In some embodiments, the software facility may be implemented as part of the filtering or other agents that execute within the email infrastructure.

FIG. 1 is a high-level block diagram showing an environment in which the message hygiene stamp may operate. The environment illustrates an example of an email topology comprised of email clients and servers that are configured to send and receive email messages, and which may be deployed by an enterprise. Within the illustrated email infrastructure, one or more filtering agents that include the logic to annotate the result of the filtering operations in a message hygiene stamp may be deployed on one or more of the email clients and servers in the email infrastructure.

As depicted in FIG. 1, the environment comprises a plurality of client computing systems 102, a plurality of mailbox servers 104, a directory server 106, a bridgehead server 108, an edge server 110, and a firewall 112 coupled to a network 114. The illustrated environment is only one example of a suitable email infrastructure and is not intended to suggest any limitation as to the scope of use or functionality of the described techniques. For example, the number of clients and the various different servers are provided only as an example and for ease of explanation and one skilled in the art will appreciate that there may be a different number of clients and/or different number of servers in the email infrastructure. Moreover, the naming and placement of the servers is not intended to suggest any limitation as to the scope of use or functionality of the described techniques. As used herein, the terms "connected," "coupled," or any variant thereof, means any connection or coupling, either direct or indirect, between two or more elements; the coupling of the connection between the elements can be physical, logical, or a combination thereof.

Each client computing system is shown coupled to a mailbox server. In general terms, the client computing systems facilitate the execution of email client application programs that may be used, for example, by persons to read and send email messages. The mailbox servers facilitate the receipt, storage and maintenance of email messages for the email clients. The mailbox servers may store personal data and information services, such as, scheduling, unified messaging and mailbox agents. The bridgehead server facilitates email routing, for example, internal to the enterprise. The directory server maintains a list of servers that may be trusted in terms of accepting their message hygiene stamps.

In general terms, the edge server functions as an email gatekeeper for the email clients configured in the email infrastructure in that the edge server provides the connection to the network, and relays email messages to and from the network. The edge server may provide basic routing services.

In general terms, the firewall controls the traffic between the network and the email infrastructure. For example, the firewall may protect the computing systems and other components in the email infrastructure by only allowing email messages (i.e., port 25 traffic) to enter the email infrastructure and preventing all unwanted messages from entering the email infrastructure. Operation of firewalls are generally known to one of ordinary skill in the art.

In general terms, the network is a communications link that facilitates the transfer of electronic content. In one embodiment, the network includes the Internet. It will be appreciated that the network may be comprised of one or more other types of networks, such as a local area network, a wide area network, a point-to-point dial-up connection, and the like.

The computing systems, such as the servers and clients in the email infrastructure, may include one or more central processing units, memory, input devices (e.g., keyboard and pointing devices), output devices (e.g., display devices), and storage devices (e.g., disk drives). The memory and storage devices are computer-readable media that may contain instructions that implement the various techniques for eliminating duplicate/redundant scanning of email messages while the email message traverses the various servers within an email infrastructure, described herein. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on. One of ordinary skill in the art will appreciate that the computing systems may be of various configurations having various components.

Embodiments of the described techniques may be implemented in various operating environments that include personal computers, server computers, computing devices, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computing systems may be cell phones, personal digital assistants, smart phones, personal computers, programmable consumer electronics, digital cameras, kiosks, ATMs, and so on.

The various techniques for eliminating duplicate/redundant scanning of email messages while the email message traverses the various servers within an email infrastructure may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
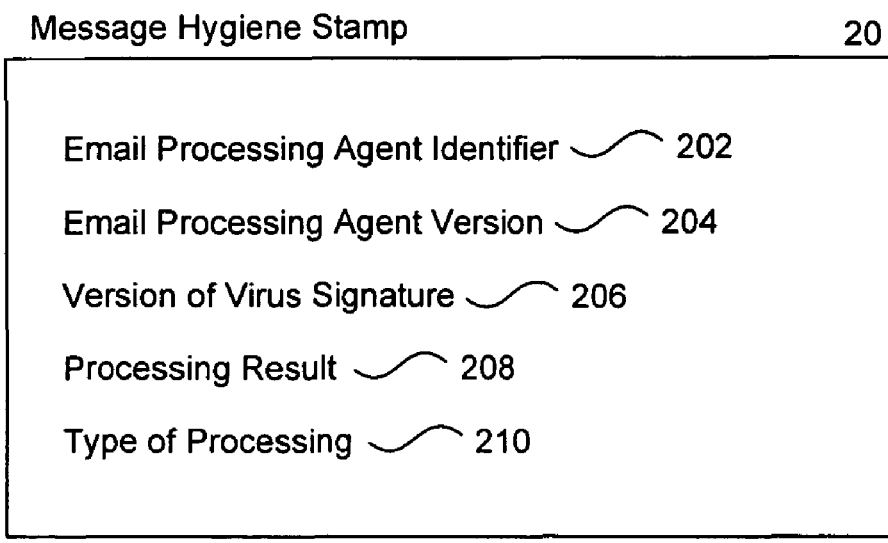
FIG. 2 is a diagram illustrating selected components of a message hygiene stamp, according to some embodiments.

FIG. 2 is a diagram illustrating selected components of an example message hygiene stamp, according to some embodiments. As depicted, a message hygiene stamp 20 comprises an email processing agent identifier 202, an email processing agent version 204, a version of virus signature 206, a processing result 208, and a type of processing 210. The email processing agent identifier identifies the email processing agent—i.e., the filtering agent. The email processing agent version specifies the version of the identified email processing agent. For example, the email processing agent may be used to identify the scanning engine version. The version of virus signature specifies the anti-virus signatures that were processed—e.g., scanned for in the email message—by the identified email processing agent. The processing result indicates the result—e.g., success or fail—of the processing of the email message by the identified email processing agent. The type of processing indicates the type of scan or processing performed on the email message. For example, the type of processing may indicate that the identified email processing agent performed a "quick scan," "deep inspection," etc. of the email message.

The filtering agent comprises logic that allows it to determine the presence of a message hygiene stamp that corresponds to the filtering agent, and to interpret its corresponding message hygiene stamp's contents. One skilled in the art will appreciate that many variations to the illustrated message hygiene stamp are possible. For example, a single message hygiene stamp may include "areas" or "sections" that are dedicated to individual filtering agents. Moreover, the contents of the message hygiene stamp may differ depending on the type of email processing agent.

In some embodiments, the message hygiene stamp may be included—i.e., carried—with an email message as part of part of the P2 header as specified by Internet Engineering Task Force RFC 2822 Internet Message Format specification. In some embodiments, the message hygiene stamp may be included in other headers of an email message, such as, by way of example, a subject line, an attachment, message body, or as part of any other email message property.

Figure 3:
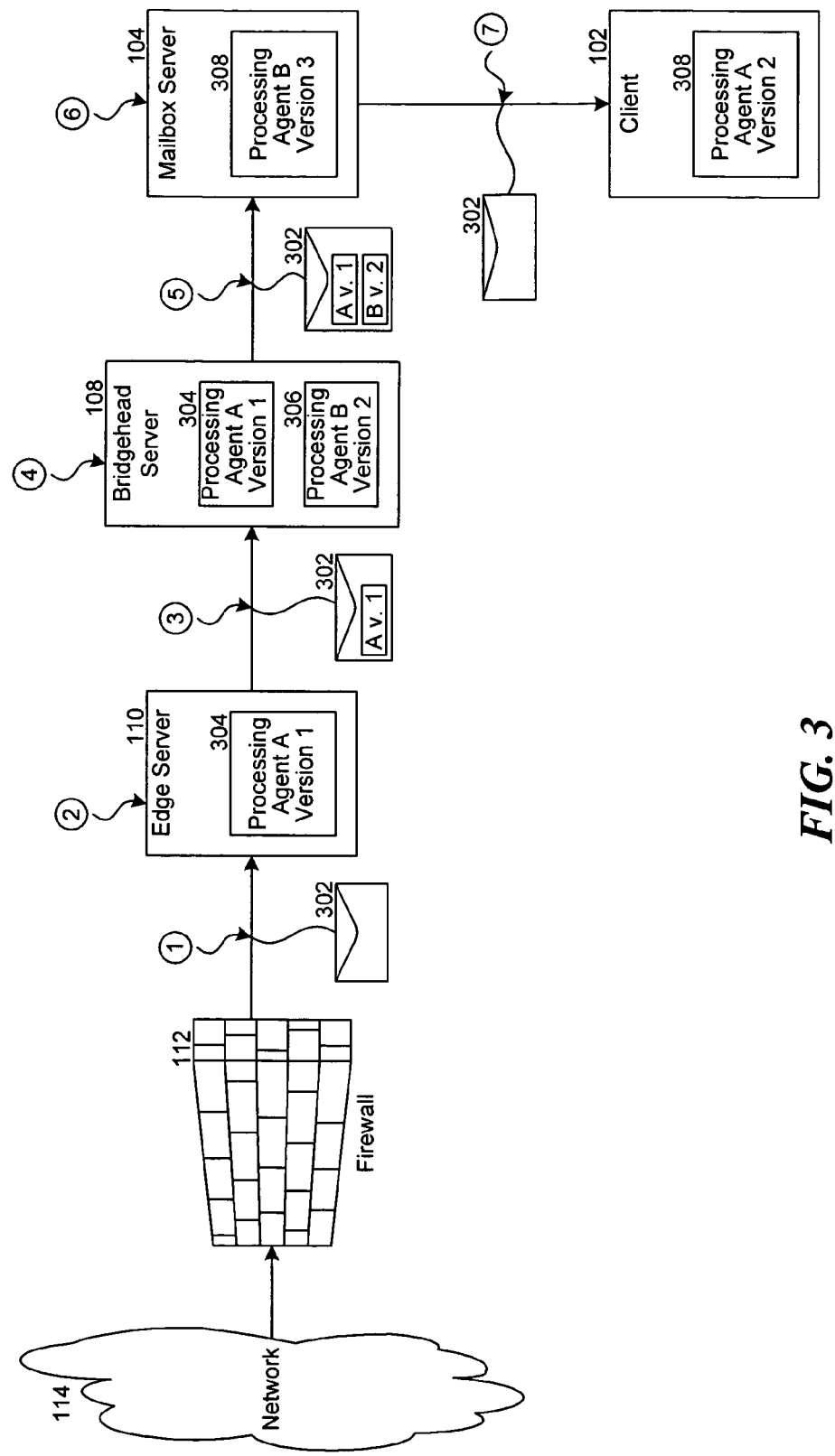
FIG. 3 is a diagram illustrating the processing of an email massage as the email message is routed within an example email infrastructure, according to some embodiments.

FIG. 3 is a diagram illustrating the processing of an email massage as the email message is routed within an example email infrastructure, according to some embodiments. By way of example, an incoming email message 302 may have been received by an edge server in an email infrastructure of an enterprise (stage 1). On the edge server (stage 2), a Processing Agent A version 1 that is deployed on the edge server determines whether it should process the email message. Processing Agent A version 1 checks the email message for the presence of its message hygiene stamp—the message hygiene stamp that corresponds to Processing Agent A version 1. Not finding the appropriate message hygiene stamp, Processing Agent A version 1 processes the email message, indicates the result of the processing in a message hygiene stamp, and places its message hygiene stamp on the email message. The email message may then be processed by the edge server (including other filtering agents that may be deployed on the edge server) and sent by the edge server to a bridgehead server within the email infrastructure on its route to the addressed recipient of the email message (stage 3).

On the bridgehead server (stage 4), a Processing Agent A version 1, which is the same filtering agent that is deployed on the edge server, determines whether it should process the received email message. Processing Agent A version 1 checks the email message for the presence of its message hygiene stamp. Finding the appropriate message hygiene stamp—i.e., the message hygiene stamp corresponding to Processing Agent A—Processing Agent A version 1 checks to determine whether the message hygiene stamp belongs to the same or later version of itself—i.e., the same or later version of Processing Agent A. Determining that the message hygiene stamp indicates that the email message was already processed by the same version of itself, Processing Agent A version 1 does not process the email message. The presence of the message hygiene stamp indicates that the email message was already processed by another instance of the processing agent "upstream" in the email infrastructure. The email message may then be passed for processing by a Processing Agent B version 2 that is also deployed on the edge server. Processing Agent B version 2 checks the email message for the presence of its message hygiene stamp. Not finding the appropriate message hygiene stamp, Processing Agent B version 2 processes the email message, indicates the result of the processing in a message hygiene stamp, and places its message hygiene stamp on the email message. The email message may then be processed by the bridgehead server (including other filtering agents that may be deployed on the edge server) and sent by the bridgehead server to a mailbox server within the email infrastructure on its route to the addressed recipient of the email message (stage 5).

On the mailbox server (stage 6), a Processing Agent B version 3 that is deployed on the mailbox server determines whether it should process the email message. Processing Agent B version 3 checks the email message for the presence of its message hygiene stamp. Processing Agent B version 3 finds its message hygiene stamp, but determines that the message hygiene stamp indicates or corresponds to an earlier version of itself—i.e., the message hygiene stamp that was placed by Processing Agent B version 2. Processing Agent B version 3 then processes the email message, indicates the result of the processing in a message hygiene stamp, and places its message hygiene stamp on the email message. In some embodiments, Processing Agent B version 3 may remove earlier versions of its message hygiene stamp from the email message. In other embodiments, Processing Agent B version 3 may not remove earlier versions of its message hygiene stamp, thus allowing the earlier version message hygiene stamps to be carried with the email message. The email message may then be processed by the mailbox server. For example, the mailbox server may place the email message in a mailbox assigned to the recipient of the email message.

Subsequently, for example, when the addressed recipient of the email message uses an email client to retrieve the email message, the email message is sent by the mailbox server to the email client (stage 7). In some embodiments, the mailbox server strips the message hygiene stamps from the email message prior to sending the email message to the email client. In some embodiments, the mailbox server may not strip the message hygiene stamps from the email message prior to sending the email message to the email client. In these embodiments, the email client can use the presence or absence of the message hygiene stamps to identify email messages that may be insecure.

One skilled in the art will appreciate that an outgoing email message may be processed in a similar manner as discussed above with regard to the incoming email message.

In some embodiments, a software facility may execute at the edge of the email infrastructure—e.g., on the edge server or servers—and remove any message hygiene stamps that may be received with email messages entering the email infrastructure, and remove the message hygiene stamps from the email messages as the email messages leave the email infrastructure. In some embodiments, for email messages entering the email infrastructure, the software facility may remove the message hygiene stamps from the email messages received from untrusted sources, and allow message hygiene stamps to remain with email messages received from trusted sources. Similarly, for email messages leaving the email infrastructure, the software facility may remove the message hygiene stamps from the email messages that are being sent to untrusted destinations, and allow the message hygiene stamps to remain with the email messages that are being sent to trusted destinations. For example, a list of trusted and untrusted sources and destinations may be provided on the directory server or other suitable data repository.

One skilled in the art will also appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Figure 4:
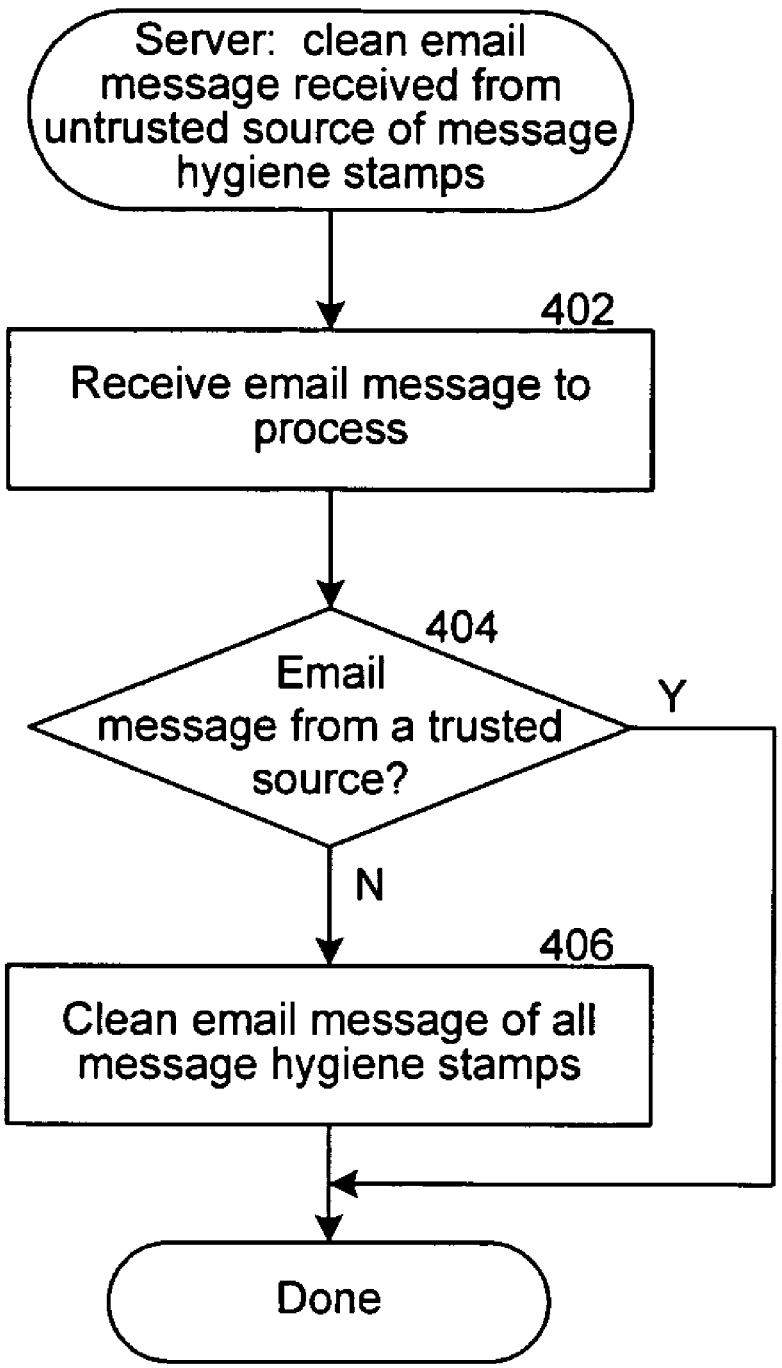
FIG. 4 is a flow diagram illustrating the processing of a component of an email server to clean an email message received from an untrusted source of message hygiene stamps, according to some embodiments.

FIG. 4 is a flow diagram illustrating the processing of a component of an email server to clean an email message received from an untrusted source of message hygiene stamps, according to some embodiments. By way of example, a software facility may execute on one or more servers in an email infrastructure to clean email messages received from untrusted sources. In block 402, the software facility receives an email message to process. In block 404, the software facility checks to determine if the email message was received from a trusted source. If the email message was not received from a trusted source, then, in block 406, the software facility cleans the email message of all message hygiene stamps that were received with the email message. Otherwise, the software facility allows the message hygiene stamps to remain with the email message.

Figure 5:
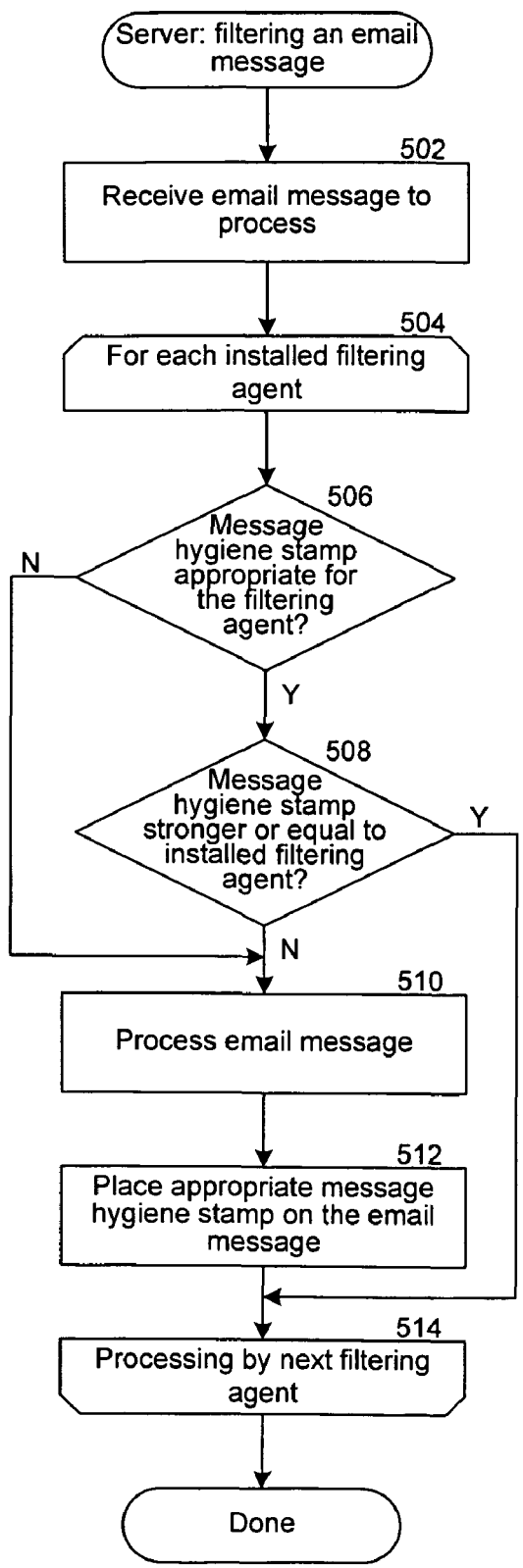
FIG. 5 is a flow diagram illustrating the processing of a server to filter an email message, according to some embodiments.

FIG. 5 is a flow diagram illustrating the processing of a server to filter an email message, according to some embodiments. By way of example, one or more filtering agents, such as an anti-virus processing agent, may be deployed on a computing system, such as a server within an email infrastructure. In block 502, the computing system receives an email message to process. For each installed filtering agent (block 504) the computing system allows the filtering agent to process the email message (blocks 506 to 512), until the email message has been processed by all of the filtering agents deployed on the computing system (block 514).

In block 516, the filtering agent checks the email message to determine if the email message includes an appropriate message hygiene stamp—i.e., a message hygiene stamp that belongs to the filtering agent. If the filtering agent determines that the appropriate message hygiene stamp is present with the email message, then, in block 508, the filtering agent checks the message hygiene stamp to determine if the message hygiene stamp is equal to or stronger than the filtering agent. Stated differently, the filtering agent checks the message hygiene stamp to determine if it indicates the same or later version of the filtering agent. If the message hygiene stamp is equal to or stronger than the filtering agent, then the filtering agent does not process the email message.

If the filtering agent determines that its message hygiene stamp is not present with the email message (block 506), or that the message hygiene stamp with the email message is weaker than the filtering agent (e.g., a prior version) (block 508), then, in block 510, the filtering agent processes the email message. In block 512, the filtering agent creates a message hygiene stamp that records the processing of the email message by the filtering agent and places the message hygiene stamp on the email message.

Figure 6:
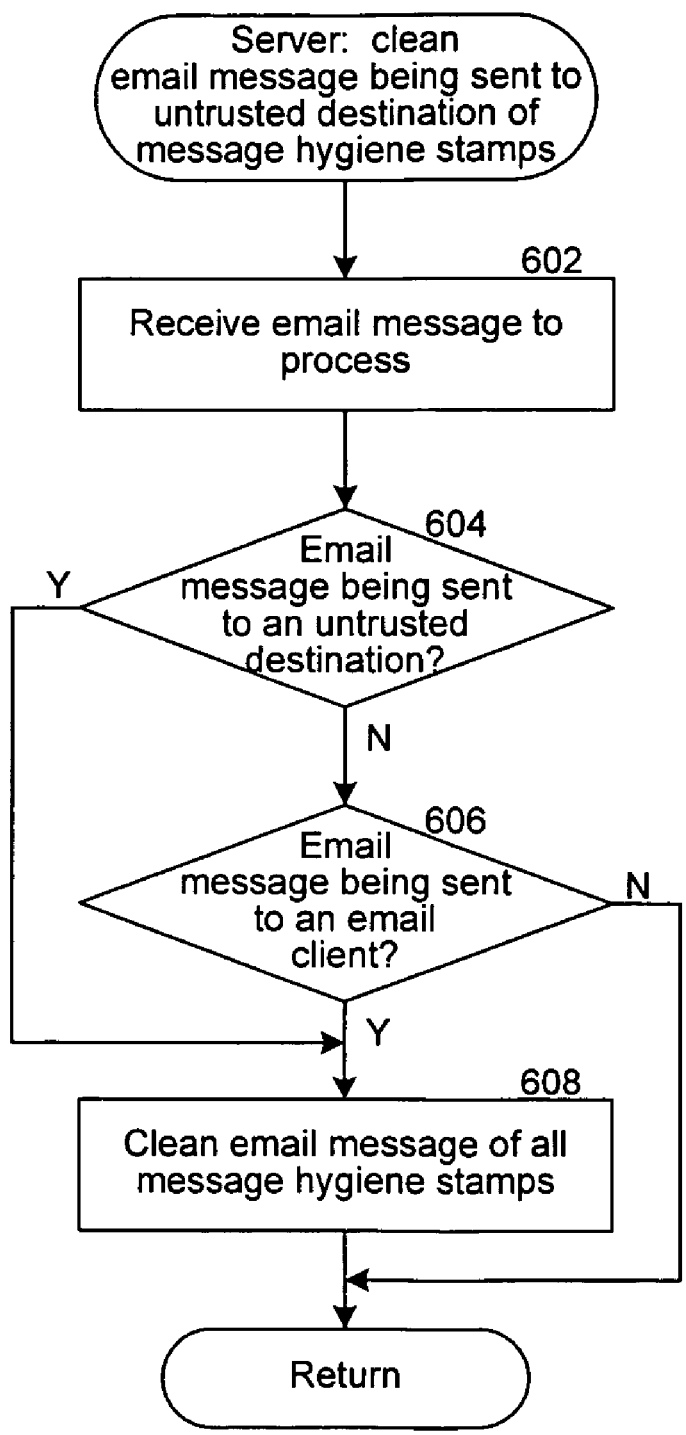
FIG. 6 is a flow diagram illustrating the processing of a component of an email server to clean an email message being sent to an untrusted destination of message hygiene stamps, according to some embodiments.

FIG. 6 is a flow diagram illustrating the processing of a component of an email server to clean an email message being sent to an untrusted destination of message hygiene stamps, according to some embodiments. By way of example, a software facility may execute on one or more servers in an email infrastructure to clean email messages received from untrusted sources. In block 602, the software facility receives an email message to process. In block 604, the software facility checks to determine if the email message is being sent to an untrusted destination. If the email message is not being sent to an untrusted destination, then, in block 606, the software facility checks to determine if the email message is being sent to an email client. If the email message is not being sent to an email client (block 606), then the software facility allows the message hygiene stamps to remain with the email message. Stated differently, since the email message is being sent to a trusted server, the message hygiene stamps are sent with the email message to the trusted server. Otherwise, if the email message is being sent to an untrusted destination (block 604) or if the email message is being sent to an email client (block 606), then, in block 608, the software facility cleans the email message of all message hygiene stamps that are included with the email message.

Figure 7:
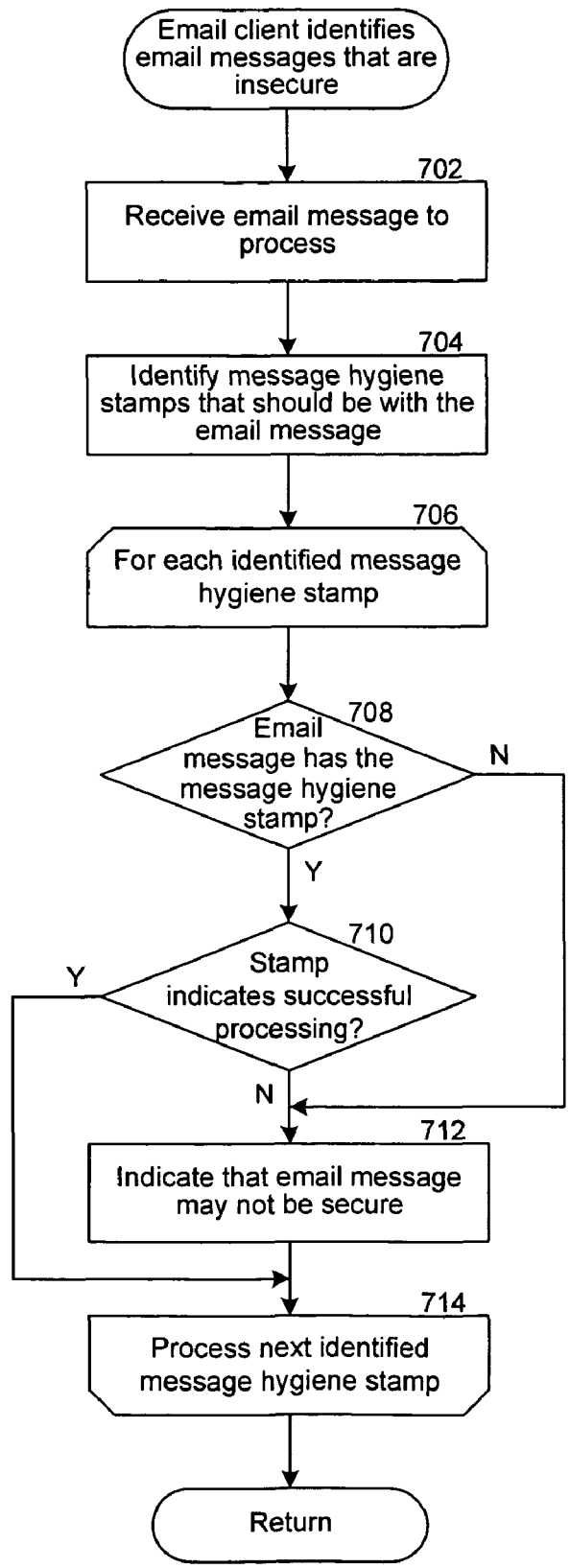
FIG. 7 is a flow diagram illustrating the processing of a component of an email client to identify email messages that are insecure, according to some embodiments.

FIG. 7 is a flow diagram illustrating the processing of a component of an email client to identify email messages that are insecure, according to some embodiments. In block 702, the email client receives an email message to process. In block 704, the mailbox identifies the message hygiene stamps that should be with the email message. For example, the message hygiene stamps that should be present with the email messages may be specified in an email security policy that is deployed for the email infrastructure. The email client, for each identified message hygiene stamp that should be present with the email message (block 706), performs blocks 708 to 712, until the identified message hygiene stamps have been processed (block 714).

In block 708, the email client checks to determine whether the email message has the identified message hygiene stamp. If the email message has the identified message hygiene stamp, then, in block 710, the email client checks the message hygiene stamp received with the email message to determine if the message hygiene stamp indicates successful processing of the email message by the filtering agent identified by the message hygiene stamp. If the message hygiene stamp received with the email message indicates that the email message was successfully processed, then, in block 714, the email client processes the next identified message hygiene stamp.

Otherwise, if the email client determined that the email message did not have the identified message hygiene stamp (block 708) or that the message hygiene stamp received with the email message indicated that the email message was not successfully processed (block 710), then, in block 712, the email client indicates that the email message may not be secure. For example, the email client may display to the recipient of the email message a warning message and/or create an entry in an error log indicating that the email message was not successfully processed by the filtering agent. Subsequent to indicating that the email message may not be secure (block 712), the email client, in block 714, processes the next identified message hygiene stamp.

In some embodiments, when an email message does not have one or more message hygiene stamps as dictated by a security policy and/or one or more message hygiene stamps received with the email message indicates unsuccessful processing, the email client may send an alert to an administrator indicating that there is a route in the email infrastructure that might be insecure. In some embodiments, the email client may send email messages that do not adhere to the deployed security policy to a server, for example, within the email infrastructure, for further processing. For example, the server may apply the missing security polices to the email message.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method in an email system for filtering an email message, wherein the email system comprises a computer and a plurality of installed filtering agents, each filtering agent having an identifier that identifies a type of the filtering agent and a version of the filtering agent, the method comprising:
    receiving by the computer the email message, the email message having a plurality of message hygiene stamps, each of the plurality of message hygiene stamps having an identifier identifying a type of a previous filtering agent that previously filtered the email message, a version of the previous filtering agent, virus signatures scanned by the previous filtering agent, and a result of filtering by the previous filtering agent;
    determining by the computer whether the email message is received from a trusted source or received from an un-trusted source;
    responsive to determining that the email message is received from the trusted source,
    for each of the plurality of install filtering agents,
        determining among the plurality of message hygiene stamps in the received email message if an appropriate message hygiene stamp is present, wherein the appropriate message hygiene stamp is the message hygiene stamp has the same identifier as the installed filtering agent;
        in response to determining the appropriate message hygiene stamp is present in the received email message,
            checking the appropriate message hygiene stamp to determine if the appropriate message hygiene stamp indicates an equal version or a newer version than the installed filtering agent;
            when the appropriate message hygiene stamp indicates an equal version or a newer version than the installed filtering agent, not filtering the email message;
            when the appropriate message hygiene stamp indicates an older version than the installed filtering agent, filtering the email message by the installed filtering agent;
            modify the appropriate hygiene stamp to indicate a result of filtering, the version of the installed filtering agent, and result of the filtering;
        in response to determining the appropriate message hygiene stamp is not present,
            filtering the email message; and
            placing a new message hygiene stamp on the email message indicating that the email message was filtered with the identifier of the installed filter agent, the version of the installed filtering agent, type of scanning and result of the filtering,
    responsive to determining that the email message is received from the un-trusted source,
        removing from the email message all message hygiene stamps; and
        for each of the plurality of installed filtering agents,
            filtering the email message with the installed filtering agent; and
            placing a new message hygiene stamp on the email message, the new message hygiene having the identifier of the installed filtering agent, the version of the installed filtering agent, a type of scanning and a result of the filtering; and
    wherein the message hygiene stamps placed on the email message are transported with the email message to an email client and wherein the email client determines the filtering that has been applied to the email message by analyzing the message hygiene stamps.

2. The method of claim 1, wherein placing the new message hygiene stamp on the email message comprises replacing the message hygiene stamp present with the received email message.

3. The method of claim 1, wherein one of the plurality of the installed filtering agent is an anti-virus filter.

4. The method of claim 1, wherein one of the plurality of the installed filtering agent is a anti-spam filter.

5. The method of claim 1, wherein one of the plurality of the installed filtering agent is a compliance agent.

6. The method of claim 1, wherein one of the plurality of the installed filtering agent is a journaling agent.

7. The method of claim 1, wherein the plurality of message hygiene stamps are placed in an attachment to the email message.

8. The method of claim 1, wherein the plurality of message hygiene stamps are placed in a header of the email message.

9. The method of claim 1 further comprising:
    determining whether the email message is to be sent to an un-trusted destination; and subsequent to determining that the email message is to be sent to the un-trusted destination, cleaning the email message of all message hygiene stamps present with the email message.

10. A computer readable medium storing computer-executable instructions for controlling a computing device to perform a method of filtering an email message, wherein the computing device comprises a plurality of installed filtering agents, each filtering agent having an identifier that identifies a type of the filtering agent and a version of the filtering agent, the method comprising:

receiving the email message, the email message having a plurality of message hygiene stamps, each of the plurality of message hygiene stamps having an identifier identifying a type of a previous filtering agent that previously filtered the email message, a version of the previous filtering agent, virus signatures scanned by the previous filtering agent, and a result of filtering by the previous filtering agent;

determining whether the email message is received from a trusted source or received from an un-trusted source;

responsive to determining that the email message is received from the trusted source, for each of the plurality of install filtering agents, determining among the plurality of message hygiene stamps in the received email message if an appropriate message hygiene stamp is present, wherein the appropriate message hygiene stamp is the message hygiene stamp has the same identifier as the installed filtering agent;

in response to determining the appropriate message hygiene stamp is present in the received email message, checking the appropriate message hygiene stamp to determine if the appropriate message hygiene stamp indicates an equal version or a newer version than the installed filtering agent;

when the appropriate message hygiene stamp indicates an equal version or a newer version than the installed filtering agent, not filtering the email message;

when the appropriate message hygiene stamp indicates an older version than the installed filtering agent, filtering the email message by the installed filtering agent;

modify the appropriate hygiene stamp to indicate a result of filtering, the version of the installed filtering agent, and result of the filtering;

in response to determining the appropriate message hygiene stamp is not present, filtering the email message by the installed filtering agent; and placing a new message hygiene stamp on the email message indicating that the email message was filtered with the identifier of the installed filtering agent, the version of the installed filtering agent, type of scanning and a result of the filtering, responsive to determining that the email message is received from the un-trusted source, removing from the email message of all message hygiene stamps; and for each of the plurality of installed filtering agents, filtering the email message with the installed filtering agent; and placing a new message hygiene stamp on the email message, the new message hygiene having the identifier of the installed filtering agent, the version of the installed filtering agent, a type of scanning and result of the filtering;

wherein message hygiene stamps placed on the email message are transported with the email message to an email client and wherein the email client determines the filtering that has been applied to the email message by analyzing the message hygiene stamps.

11. The computer-readable medium of claim 10, wherein placing the new message hygiene stamp on the email message comprises replacing the message hygiene stamp present with the received email message.

12. The computer-readable medium of claim 10, wherein the plurality of message hygiene stamps are placed in an attachment to the email message.

13. The computer-readable medium of claim 10, wherein the plurality of message hygiene stamps are placed in a header of the email message.

14. The computer-readable medium of claim 10 further comprising:

determining whether the email message is to be sent to an un-trusted destination; and subsequent to determining that the email message is to be sent to the un-trusted destination, cleaning the email message of all message hygiene stamps present with the email message.

15. A computing device programmed to filter an email message, the computing device comprises:

a memory;

a processor;

a plurality of installed filtering agents, each filtering agent having an identifier that identifies a type of the filtering agent and a version of the filtering agent;

a component for receiving the email message, the email message having a plurality of message hygiene stamps, each of the plurality of message hygiene stamps having an identifier identifying a type of a previous filtering agent that previously filtered the email message, a version of the previous filtering agent, virus signatures scanned by the previous filtering agent, and a result of filtering by the previous filtering agent;

a component for determining whether the email message is received from a trusted source or received from an un-trusted source;

a component for responsive to determining that the email message is received from the trusted source, for each of the plurality of install filtering agents, determining among the plurality of message hygiene stamps in the received email message if an appropriate message hygiene stamp is present, wherein the appropriate message hygiene stamp is the message hygiene stamp has the same identifier as the installed filtering agent;

in response to determining the appropriate message hygiene stamp is present in the received email message, checking the appropriate message hygiene stamp to determine if the appropriate message hygiene stamp indicates an equal version or a newer version than the installed filtering agent;

when the appropriate message hygiene stamp indicates an equal version or a newer version than the filtering agent, not filtering the email message;

when the appropriate message hygiene stamp indicates an older version than the installed filtering agent, filtering the email message by the installed filtering agent;

modify the appropriate hygiene stamp to indicate a result of filtering, the version of the installed filtering agent, and result of the filtering;

in response to determining the appropriate message hygiene stamp is not present, filtering the email message by the installed filtering agent and;

placing a new message hygiene stamp on the email message indicating that the email message was filtered with the identifier of the installed filtering agent, the version of the installed filtering agent, type of scanning and result of the filtering, a component for, responsive to determining that the email message is received from the un-trusted source, removing from the email message all message hygiene stamps; and for each of the plurality of installed filtering agents, filtering the email message with the installed filtering agent; and placing a new message hygiene stamp on the email message, the new message hygiene having the identifier of the installed filtering agent, the version of the installed filtering agent, a type of scanning and a result of the filtering;

wherein message hygiene stamps placed on the email message are transported with the email message to an email client and wherein the email client determines the filtering that has been applied to the email message by analyzing the message hygiene stamps.

16. The method of claim 10, wherein placing the new message hygiene stamp on the email message comprises replacing the message hygiene stamp present with the received email message.

* * * * *

UNITED STATES PATENT AND TRADEMARK OFFICE
CERTIFICATE OF CORRECTION

| | | |
|---|---|---|
| PATENT NO. | : 7,774,413 B2 | Page 1 of 1 |
| APPLICATION NO. | : 11/215823 | |
| DATED | : August 10, 2010 | |
| INVENTOR(S) | : Mihai Costea et al. | |

It is certified that error appears in the above-identified patent and that said Letters Patent is hereby corrected as shown below:

In column 2, line 51, after "agents," insert -- and --.

In column 11, line 60, in Claim 10, after "message" delete "of".

Signed and Sealed this
Twenty-sixth Day of April, 2011

David J. Kappos
*Director of the United States Patent and Trademark Office*